United States Patent [19]

Devine et al.

[11] Patent Number: 5,630,402
[45] Date of Patent: May 20, 1997

[54] FUEL INJECTION TIMING SYSTEM

[75] Inventors: Michael J. Devine, Kent; Robert L. Kiliz, Sumner, both of Wash.

[73] Assignee: Timing Systems, Inc., Kent, Wash.

[21] Appl. No.: 666,081

[22] Filed: Jun. 19, 1996

[51] Int. Cl.$^6$ .............................. F02M 37/04; F16D 3/10
[52] U.S. Cl. .............................................. 123/501; 464/2
[58] Field of Search ........................ 123/500, 501, 123/502, 445–6; 464/1, 2, 160

[56] References Cited

U.S. PATENT DOCUMENTS

| | | | |
|---|---|---|---|
| 1,284,471 | 11/1918 | Schmid | 464/1 |
| 3,603,112 | 9/1971 | Sola . | |
| 3,726,608 | 4/1973 | Bostwick et al. | 464/1 |
| 3,934,430 | 1/1976 | Fuso . | |
| 4,142,498 | 3/1979 | Hammond | 123/501 |
| 4,305,352 | 12/1981 | Oshima et al. | 123/501 |
| 4,305,366 | 12/1981 | Imasato et al. | 464/2 |
| 4,411,237 | 10/1983 | Ableitner et al. | 123/501 |
| 4,425,896 | 1/1984 | Murayama | 123/501 |
| 4,476,837 | 10/1984 | Salzgeber | 123/502 |
| 4,566,421 | 1/1986 | Bauer et al. | 123/502 |
| 4,998,523 | 3/1991 | Geyer et al. | 123/501 |
| 5,172,661 | 12/1992 | Brune et al. | 123/90.17 |
| 5,365,898 | 11/1994 | Mueller | 464/2 |
| 5,417,187 | 5/1995 | Meyer et al. | 123/90.17 |
| 5,447,126 | 9/1995 | Kondoh et al. | 123/90.17 |

Primary Examiner—Thomas N. Moulis
Attorney, Agent, or Firm—David P. Campbell; Stanley N. Protigal

[57] ABSTRACT

An electronic timing system for controlling the injection angle of a fuel pump, comprising an input sleeve (12), an output drum (36), an intermediate drive sleeve (30), a drive plate (60), a drive yoke (76), and a stepper motor (90). Drive sleeve (30) includes a pair of radially inwardly and outwardly projecting drive pins (32), and drum (36) and input sleeve (12) both include helical slots (38) and (16), respectively, through which pins (32) project. Vertical movement of yoke (76) causes axial movement of drive plate (60) and drive sleeve (30), which causes a relative rotational adjustment of angle between input sleeve (12) and output drum (36), for retarding and advancing the timing of the fuel injection system.

7 Claims, 4 Drawing Sheets

FUEL INJECTION TIMING SYSTEM

TECHNICAL FIELD

The present invention pertains to fuel injection systems, and more particularly, to an apparatus for controlling the timing of fuel injection pumps in internal combustion engines.

BACKGROUND OF THE INVENTION

U.S. Pat. Nos. 3,934,430 of Fuso, 4,566,421 of Bauer et al., 3,603,112 of Sola, 5,417,187 of Meyer et al. 5,447,126 of Kondoh et al. disclose various fuel injection pump timing systems that include intermediate couplings between a cam shaft and a drive shaft. These intermediate couplings are axially adjustable by means of a drive source taken off of the engine. For example, Fuso discloses a hydraulic fluid pressure source (16), powered by the engine oil pump, that applies metered pressure to an inlet (22) of an hydraulic actuator of a injection timing control device (10). The present invention is an improvement upon the design concepts disclosed by these and other patents, wherein the power source for controlling the relative angular position of a camshaft to a drive shaft is dependent upon the crankshaft or another operative part of the engine.

Another currently used timing system for fuel injection pumps include a mechanical, centrifugally driven device, which varies a cam on an auxiliary drive to the fuel injection pump to adjust the relative cam angle about seven degrees of crankshaft rotation. In such a system, the relative cam angle is directly proportional to the revolutions per minute of the engine. The present invention provides a more sophisticated method of controlling the fuel pump angle that is continuously variable over a greater range of degrees and regardless of the engine RPM.

DISCLOSURE OF THE INVENTION

Briefly described, the present invention comprises a fuel injection timing system for controlling the angular position of a diesel engine fuel injection pump. The timing system comprises an output drive member adapted to be rotationally coupled to a pump shaft of the injection pump to rotate the injection pump shaft about its axis. The timing system further includes an input drive member adapted to be rotationally coupled to a drive source. An intermediate drive sleeve is axially movable along an axis of the pump shaft between the output and input drive members. An actuator is movable along an axis perpendicular to the pump shaft axis, and coupled to the intermediate sleeve, to move the intermediate sleeve along the pump shaft axis. The intermediate sleeve is coupled to the output drive member in a manner where movement of the intermediate sleeve along the pump shaft axis causes rotational movement of the output drive member about the pump shaft axis. The intermediate sleeve also is coupled to the input drive member in a manner where axial movement of the intermediate sleeve causes the intermediate sleeve to rotate about the pump shaft axis. In operation, the actuator axially drives the intermediate sleeve along the pump shaft axis to adjust the angular position of the output drive member relative to the input drive member.

According to an aspect of the invention, the intermediate drive sleeve includes a pair of radially projecting pins and the output drive member includes a pair of helical slots. Each helical slot is adapted to receive a pin and cause rotation of the output drive member as the intermediate sleeve moves axially along the pump shaft axis. Preferably, the pins are positioned 180 degrees apart on opposite sides of the intermediate sleeve, and the helical slots of the output drive member are positioned 180 degrees on opposite sides of the output drive member. This provides a pair of coupling forces to rotate the output drive member.

According to another aspect of the invention, the input drive member also includes a pair of helical slots, each helical slot adapted to receive a pin. The helical slots of the input drive member are curved in a direction opposite to that of the helical slots of the output drive member, so that linear movement of the intermediate sleeve causes rotation of the intermediate sleeve due to the pins engaging the helical slots of the input drive member. In this manner, axial movement of the intermediate sleeve causes it to rotate with respect to the input drive member and causes the output drive member to rotate with respect to the intermediate drive sleeve. Thus, twice the angular rotation is achieved for a given axial movement of the intermediate drive sleeve.

According to an aspect of the invention, the actuator includes a drive plate that is axially movable and that includes a pair of radially projecting trunnions. The drive plate engages the intermediate drive sleeve. The actuator also includes a yoke drive having a pair of angled slots, each slot receiving a trunnion of the drive plate. Movement of the yoke drive in a direction perpendicular to the pump shaft axis moves the drive plate axially along the pump shaft axis, thereby moving the intermediate drive sleeve along the pump shaft axis. Preferably, the actuator includes a stepper motor for moving the yoke drive. A stepper motor allows for control of the timing system of the present invention at engine start-up. This provides control of the fuel injection timing at a time of minimum fuel efficiency and maximum exhaust expulsion.

According to another aspect of the invention, the output drive member includes an opening for receiving the pump shaft. An adaptor is provided for positioning in the output drive member opening. The adaptor includes on inner opening sized to closely fit the outside diameter of the pump shaft. As such, the output drive member can be coupled to pump shafts of varying diameters by selecting an adaptor with an inner opening approximately the size of the pump shaft diameter. This allows the timing system of the present invention to be retrofitted to existing diesel engines, regardless of their pump shaft design. In addition, the timer input shaft is hollow to allow installation without disassembling the timer system.

These and other features, objects, and advantages will become apparent from the following detailed description of the best mode, when read in conjunction with the enclosed drawings, and the claims, which are all incorporated herein as part of the disclosure of the invention.

BRIEF DESCRIPTION OF THE DRAWINGS

In the drawings, like reference numerals refer to like parts throughout the several views, wherein.

BEST MODE FOR CARRYING OUT THE INVENTION

Figure 1:
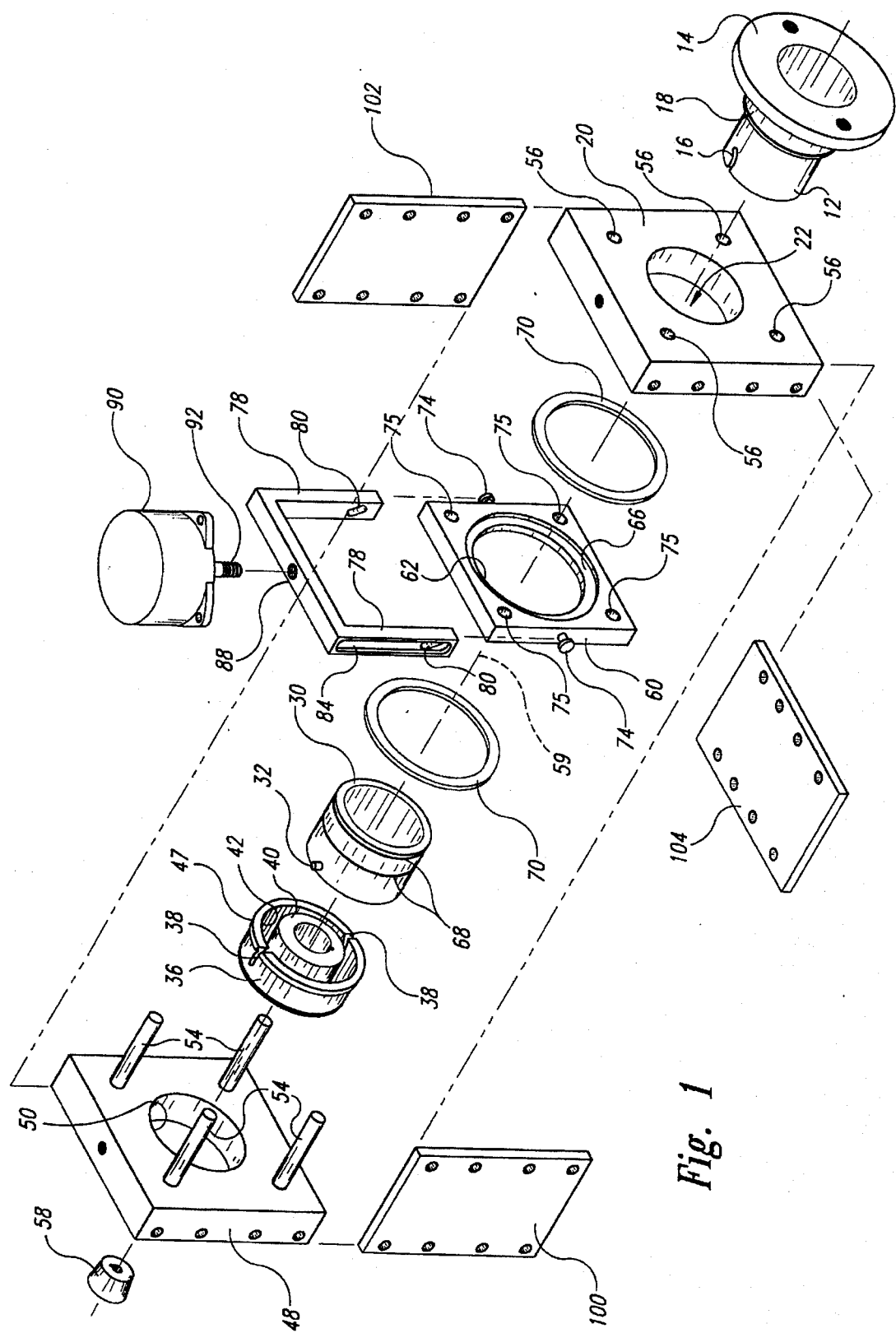
FIG. 1 is an exploded pictorial view of the timing device of the present invention.
Figure 2:
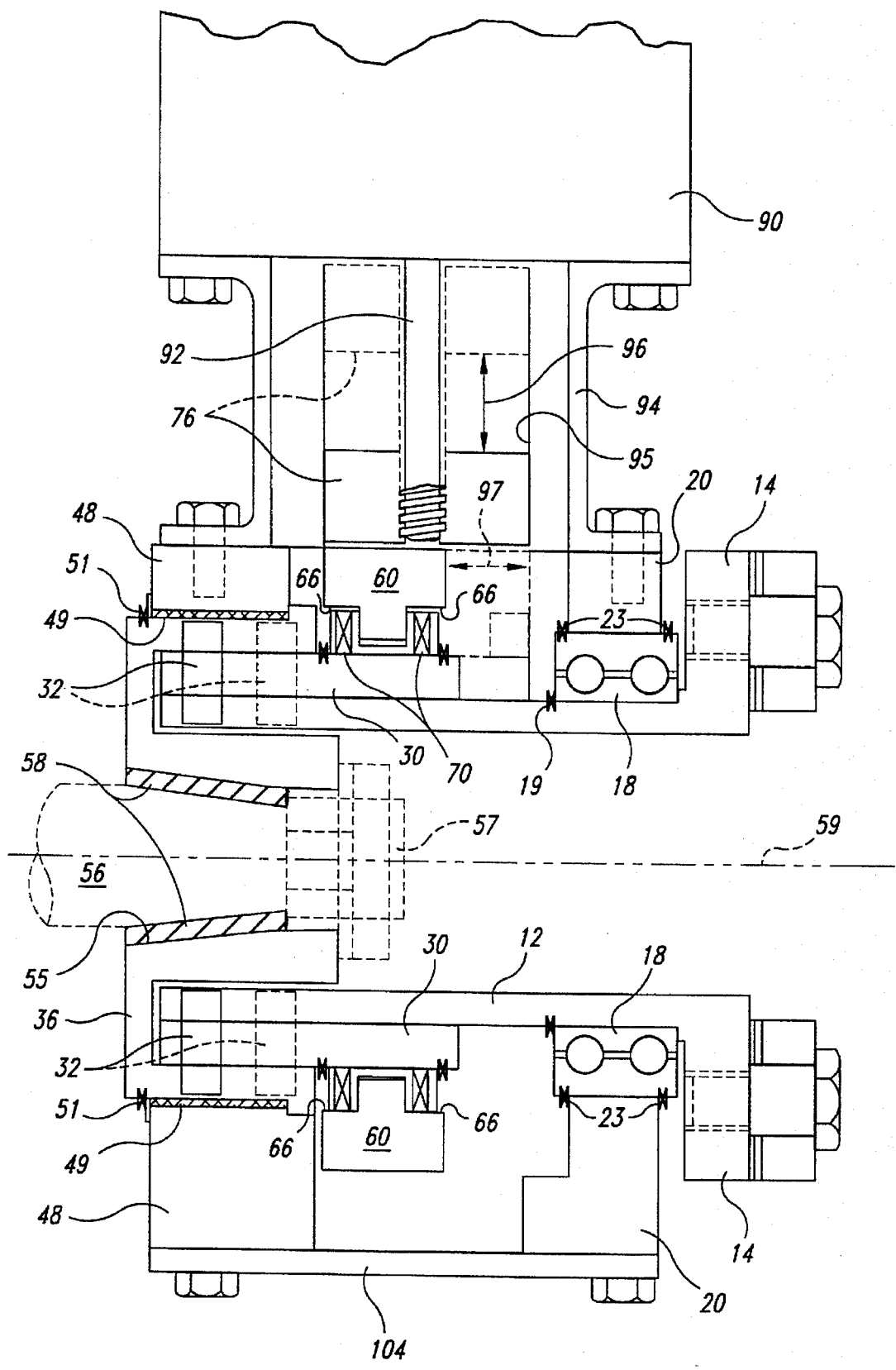
FIG. 2 is a vertical section view of the timing device of the present invention.

Referring to FIGS. 1 and 2, the present invention comprises a fuel injection timing device 10 that includes an input sleeve 12 adapted to be rotatably coupled to an auxiliary drive source or perhaps the gear train of a diesel engine. Input sleeve 12 includes a flange 14 for coupling the input sleeve to the drive source. Input sleeve 12 also includes a pair of helical slots 16 (only one shown in FIG. 1), which are 180° opposed from one another about the inside end of input sleeve 12. Helical slots 16 spiral counter-clockwise inwardly from the inside end of sleeve 12. A sealed annular double row ball bearing 18 is mounted on input sleeve 12 and held thereon by means of a retainer ring 19, shown in FIG. 2. Input sleeve 12 functions as an input drive member that couples to a drive source and transfers a rotational drive force to the components of the invention, discussed herein.

A rectangular input end plate 20 includes a central opening 22 for receiving input sleeve 12 and bearing 18. Input sleeve 12 is rotatably carried by input end plate 20 and held thereagainst by flange 14 and a pair of retainer rings 23. Input end plate 20 forms part of the support housing for timing device 10.

An intermediate cylindrical drive sleeve 30 is rotatably coupled to input sleeve 12. The diameter of input sleeve 12 is smaller than the diameter of drive sleeve 30. Accordingly, input sleeve 12 is positioned within drive sleeve 30, as best seen in FIG. 2. Drive sleeve 30 includes a pair of drive pins 32 (only one shown in FIG. 1). Drive pins 32 are 180° opposed to one another and extend radially inwardly and outwardly from drive sleeve 30. The inwardly projecting portions of drive pins 32 ride in helical slots 16 of input sleeve 12 and provide the rotational coupling therebetween, i.e. rotation of input sleeve 12 causes drive sleeve 30 to rotate due to the driving engagement between pins 32 and slots 16.

A cylindrical output drum 36 includes a pair of helical slots 38. Helical slots 38 are spiraled clockwise, opposite to the spiraling of helical slots 16 of input sleeve 12. Output drum 36 also includes an inner cylindrical hub 40. Hub 40 and drum 36 form therebetween an annular chamber 42. The outer diameter of output drum 36 is slightly greater than the diameter of input sleeve 12, and the diameter of hub 40 is slightly smaller than the diameter of input sleeve 12. The annular chamber 42 receives the inner end of input sleeve 12 and also receives drive sleeve 30. The outwardly projecting pins 32 of drive sleeve 30 extend into helical slots 38 of output drum 36. This arrangement, like the pin-and-slot coupling between input sleeve 12 and drive sleeve 30, provides a rotational coupling between output drum 36 and drive sleeve 30. Output drum functions as an output drive member that couples the intermediate drive sleeve to the pump shaft an imparts a rotational force to the pump shaft from the intermediate drive sleeve.

An output end plate 48 includes a central opening 50 for receiving output drum 36. Output drum 36 includes a flared rim 47 along its inside edge. Rim 47 sets against output end plate 48 and along with a retainer ring 51 (FIG. 2) holds output drum 36 in position relative to output end plate 48. An annular bushing 49, shown in FIG. 2, is provided in central opening 50 between output end plate 48 and output drum 36, to allow output drum 36 to rotate freely within output end plate 48.

Output end plate 48 forms a part of the housing of timing device 10 and together with input end plate 20 defines the front and back sides of the timing device. Output end plate 48 also includes a set of four drive plate guide rods 54 for aligning output end plate 48 with input end plate 20. Input end plate 20 includes a set of four corresponding openings 56 for receiving guide rods 54. The ends of rods 54 are press-fitted into openings 56.

Input sleeve 12, intermediate drive sleeve 30, and output drum 36 all three are rotatably coupled together, with input sleeve 12 positioned inside of drive sleeve 30 and with both input sleeve 12 and drive sleeve 30 positioned within annular chamber 42 of output drum 36. In operation, input sleeve 12, drive sleeve 30, and output drum 36 rotate together about a pump shaft axis 59, discussed later.

The inner surface 55 of hub 40 is tapered inwardly, as shown in FIG. 2. Preferably, the driving end of a fuel pump shaft 56 likewise is tapered to create a tight fit between pump shaft 56 and hub 40. A lug nut 57 threadably couples to a threaded end of pump shaft 57 and provides a secure engagement of pump shaft 57 to output drum 36.

One of the main advantages of the present invention is its adaptability to the retrofit market. The diameters of diesel engine pump shafts vary from manufacturer to manufacturer. To allow the timing device of the present invention to mount to pump shafts of various sizes, a plurality of pump shaft adaptors can be provided, one of which is shown in FIG. 1, denoted by reference numeral 58. Adaptor 58 is frusto-conical in shape and is dimensioned to fit within hub 40. Key slots in adaptor 58 allow it to be keyed to a smaller diameter pump shaft.

With this arrangement, the timing device can be retrofitted to a variety of fuel injection pumps, regardless of their pump shaft size. The present invention will enable older diesel engines to meet engine emission requirements, especially as such emission requirements are made stricter in the future.

A rectangular drive plate 60 includes a central opening 62 through which are positioned the interfitted, coupled arrangement of input sleeve 12, drive sleeve 30, and output drum 36. An annular recess 66 is formed about central opening 62 on both sides of drive plate 60. In conjunction with annular recesses 66, intermediate drive sleeve 30 includes a pair of spaced annular slots 68. A pair of thrust bearing retainers 70 are received within the annular recesses 66 and held therein by retainer rings 71. Retainer rings 71 retain thrust bearings 70 and drive plate 60 about intermediate drive sleeve 30. Each thrust bearing 70 is a needle roller bearing with hardened thrust plates.

Drive plate 60 includes a set of four corner holes 75. Guide rods 54 extend through corner holes 75 and thereby limit movement of drive plate 60 to axial movement along axis 59. In other words, rods 54 hold drive plate 60 and drive sleeve 30 concentric with input and output sleeves 12 and 36.

A downwardly-oriented drive yoke 76 includes a pair of downwardly-extending legs 78, each including an angled slot 80. Each slot 80 angles from output end plate 48 downwardly toward input end plate 20. Drive plate 60 also includes a pair of laterally-projecting trunnions 74. A vertically-extending groove 84 is provided on the outer side of each leg 78 of yoke 76. Each groove 84 receives the head of a trunnion 74. Yoke 76 includes a threaded opening 88 along its upper bridge. An electric motor 90 includes a threaded gear bolt actuator 92 that is adapted to threadably mate with opening 88 in yoke 76. Motor 90 is an electronically-driven motor, controlled by a microprocessor controller, discussed later. Rotation of gear actuator 92 causes yoke 76 to move up and down, which in turn causes slots 80 to drive trunnions 74 and drive plate 60 axially along the axis of rotation 59 of the pump shaft.

Axial movement of drive plate 60 drives intermediate drive sleeve 30 axially, as drive sleeve 30 rotates. Drive sleeve 30, in turn, rotates output drum 36 relative to input sleeve 12. This is achieved due to the engagement of drive pins 32 with helical slots 38, 16. Rotation of output drum 36 relative to input sleeve 12 is achieved as both components rotate and drive the pump shaft. As a result, the pump shaft rotation is either accelerated or slowed, which provides the means for controlling the cam angle of the fuel injection pump, to advance or retard the engine timing.

At engine start up, the timing device of the present invention achieves significant advantages over prior systems. My timing device can retard the timing of a diesel engine at start up, due to the electrical power source required by motor 90. It is not necessary that the engine be running for my device to work. Such engine timing control at start up can decrease and in some cases eliminate cold start problems experienced by most diesel engines. With stricter engine start up emission requirements scheduled to be mandated in the future, the present invention provides a low cost, yet effective system for meeting these requirements.

Additionally, as engine rpm increases, the timing of the fuel injection pump can be advanced or retarded as dictated by the engine rpm, exhaust temperature, manifold temperature, coolant temperature, engine load, crankshaft speed, fuel rack position, throttle position, altitude, and other criteria, as is well understood by those skilled in the art. Diesel engines equipped with the present invention should also realize increased fuel efficiency and increased horsepower and meet emission requirement changes without the need for other more complicated and expensive control systems designed to meet tougher emission requirements.

Referring to FIG. 1, a pair of side plates 100, 102 and a bottom plate 104 fixedly secure together output end plate 48 and input end plate 20, to fix the spacing between these two plates. Stepper motor 90 is secured to end plates 20, 48 via brackets 94, which elevate motor 90 above end plates 20, 48. This provides an inner travel chamber 95 that accommodates movement of yoke 76. In FIG. 2, yoke 76 is shown in solid lines in a first, lowered position. In this position, yoke 76 moves intermediate drive sleeve 30 to the left toward output end plate 48. Drive sleeve 30 is shown in solid lines in this forward position. Yoke 76 is shown in dashed lines in a second, raised position. In this position, yoke 76 moves drive sleeve 30 to the right toward input end plate 20. Drive sleeve 30 is shown in dashed lines in this second position. Vertical movement of yoke 76 between its lowered and raised positions is indicated by arrow 96. Axial movement of drive sleeve 30 between its forward and backed-off positions is indicated by arrow 97.

Figure 3:
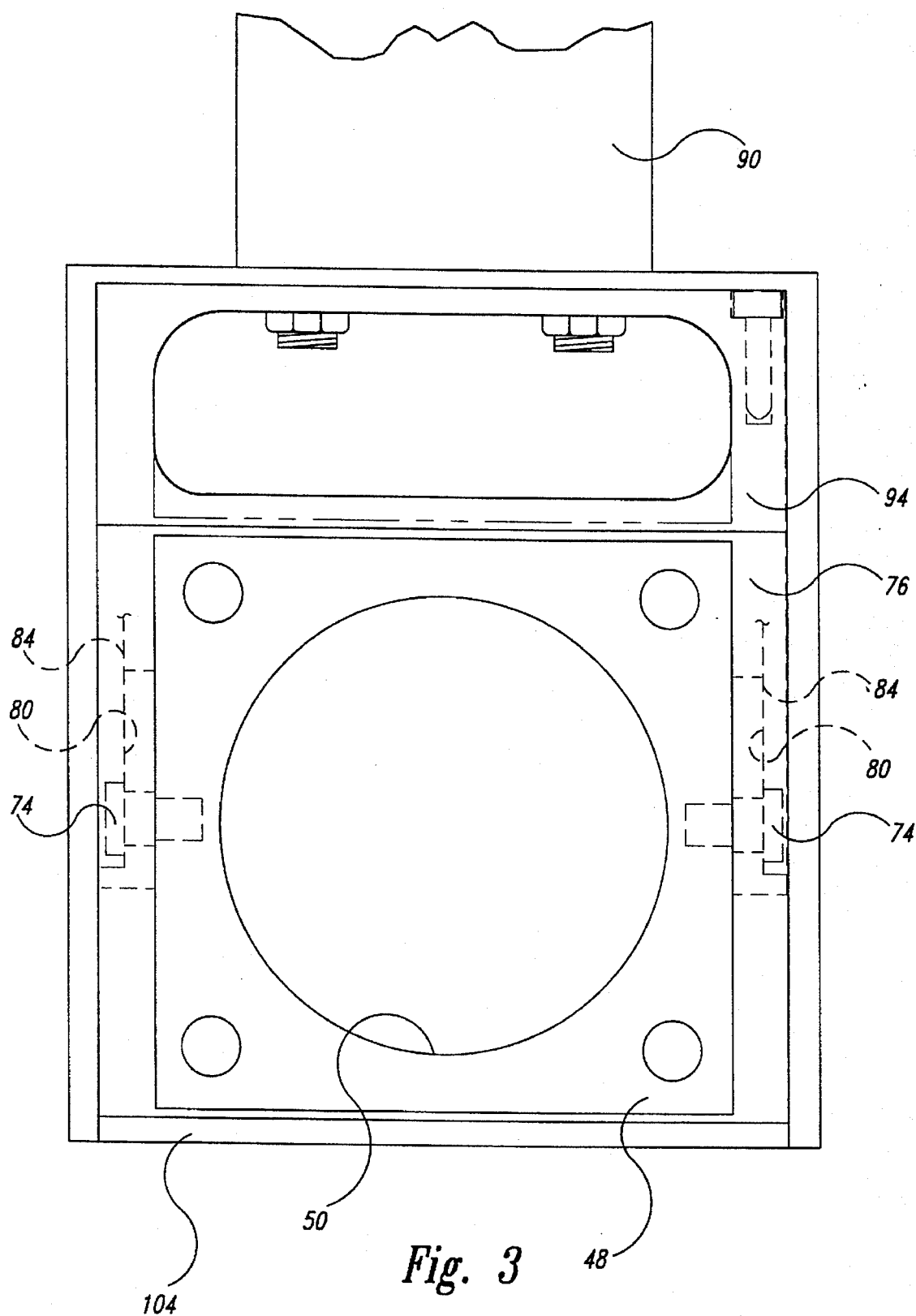
FIG. 3 is an end view of the timing device of FIG. 2.

FIG. 3 illustrates the engagement between trunnions 74 and angled slots 80. Vertical movement of yoke 76 is created by travel of trunnions 74 within slots 80. Grooves 84 provide a path of travel for the heads of trunnions 74 without interference with side plates 100, 102.

Figure 4:
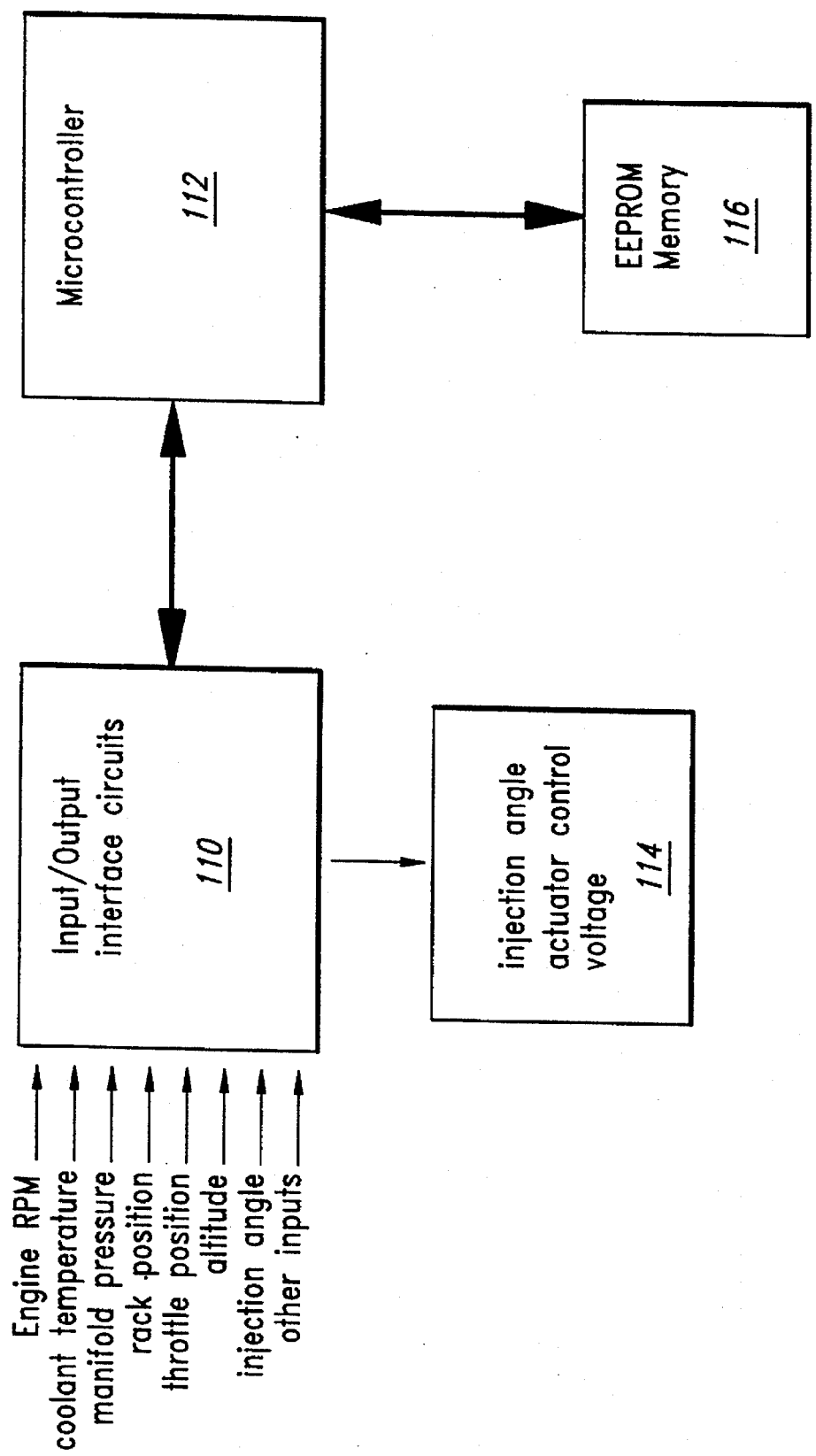
FIG. 4 is a schematic diagram of the control system for the timing device of FIGS. 1–3.

The timing system of the present invention includes an electronic control system, depicted schematically in FIG. 4. A position sensor is mechanically coupled to the gear actuator of the stepper motor. The position sensor creates a voltage that represents the current position of the stepper motor, which corresponds to the injection angle of the fuel pump.

An input/output interface circuit 110 receives input signals from various engine inputs, as listed in FIG. 4, and conditions these signals for a microprocessor controller 112. Input/output interface circuit 110 also receives a voltage signal from the stepper motor position sensor. Circuitry 110 also conditions and sends an actuator control signal 114 to the stepper motor.

Microprocessor controller 112 calculates the proper injection angle using the monitored parameters previously discussed and a look-up table. The look-up table is stored in an EEPROM 116. EEPROM 116 is pre-programmed with the necessary injection angle control information for the particular type of engine being controlled. The look-up table for a particular engine is a multidimensional map of the ideal injection angle versus operating conditions. Microprocessor controller 112 sends a signal, via input/output interface 110, to the motor to move the drive sleeve to its proper position.

The driving components of the present invention are preferably all made of steel, except end plates 20, 48, side plates 100, 102, bottom plate 104, and bracket 94, which can be from aluminum. Drive plate 60 also is made of aluminum or steel, except for trunnions 74, which are made of steel and threaded into the sides of drive plate 60. The bearings are standard 52100 or 440C bearing steel. Other materials may be used if they become preferred without affecting the function of the invention. Also, other motors may be used such as brushless, servo, gear motors, etc. As long as the motors can be controlled by the microprocessor the intent of the invention is unchanged. Any changes of materials or motors will be to increase reliability, function will remain the same.

What is claimed is:

1. A fuel injection timing system for controlling the angular position of a diesel engine fuel injection pump, comprising an output drive member adapted to be rotatably coupled to a pump shaft of the injection pump to rotate the injection pump shaft about its axis, an input drive member adapted to be rotatably coupled to a drive source, an intermediate drive sleeve axially movable along an axis of the pump shaft between the output and input drive members, and an actuator, movable along an axis perpendicular to the pump shaft axis, and coupled to the intermediate sleeve, to move the intermediate sleeve along the pump shaft axis, the intermediate sleeve coupled to the output drive member in a manner where movement of the intermediate sleeve along the pump shaft axis causes rotational movement of the output drive member about the pump shaft axis, the intermediate sleeve also coupled to the input drive member in a manner where axial movement of the intermediate sleeve causes the intermediate sleeve to rotate about the pump shaft axis, whereby the actuator axially drives the intermediate sleeve along the pump shaft axis to adjust the angular position of the output drive member relative to the input drive member.

2. The system of claim 1, wherein the intermediate drive sleeve includes a pair of radially projecting pins and the output drive member includes a pair of helical slots, each helical slot adapted to receive a pin and cause rotation of the output drive member as the intermediate sleeve moves axially along the pump shaft axis.

3. The system of claim 2, wherein the pins are positioned 180 degrees apart on opposite sides of the intermediate sleeve, and the helical slots of the output drive member are positioned 180 degrees on opposite sides of the output drive member.

4. The system of claim 2, wherein the input drive member also includes a pair of helical slots, each helical slot adapted to receive a pin, the helical slots of the input drive member being curved in a direction opposite to that of the helical slots of the output drive member, so that linear movement of the intermediate sleeve causes rotation of the intermediate sleeve due to the pins engaging the helical slots of the input drive member.

5. The system of claim 1, wherein the actuator includes a drive plate that is axially movable and includes a pair of radially projecting trunnions, the drive plate engaging the intermediate drive sleeve, the actuator also including a yoke drive having a pair of angled slots, each slot receiving a trunnion of the drive plate, so that movement of the yoke drive in a direction perpendicular to the pump shaft axis moves the drive plate axially along the pump shaft axis, thereby moving the intermediate drive sleeve along the pump shaft axis.

6. The system of claim 1, wherein the actuator includes a stepper motor for moving the yoke drive.

7. The system of claim 1, wherein the output drive member includes an opening for receiving the pump shaft, and further comprising an adaptor for positioning in the output drive member opening, the adaptor including on inner opening sized to closely fit the outside diameter of the pump shaft, whereby the output drive member can be coupled to pump shafts of varying diameters by selecting an adaptor with an inner opening approximately the size of the pump shaft diameter.

* * * * *